Oct. 9, 1956
G. M. KNEIFL
2,765,823
CHAIN SAW BLADE WITH OILING MEANS
Filed Feb. 12, 1953
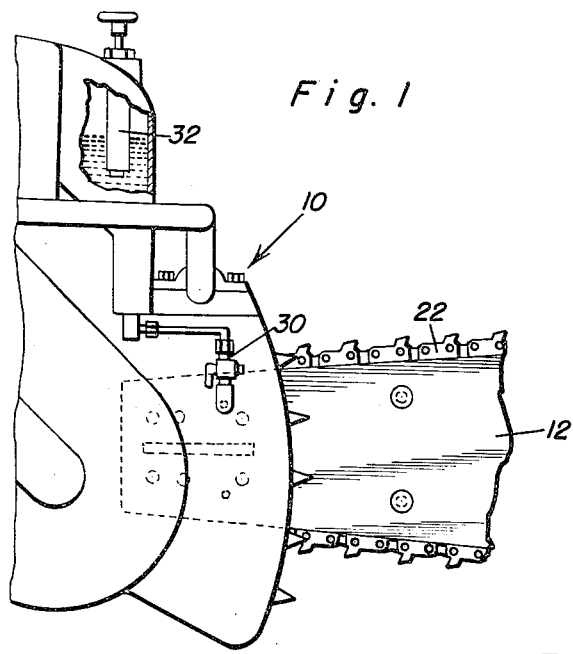
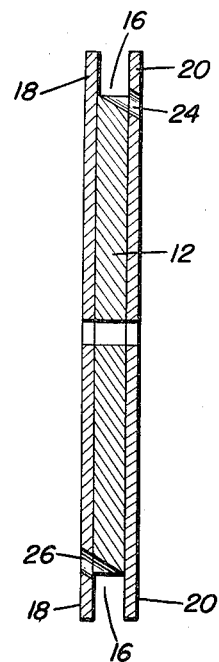
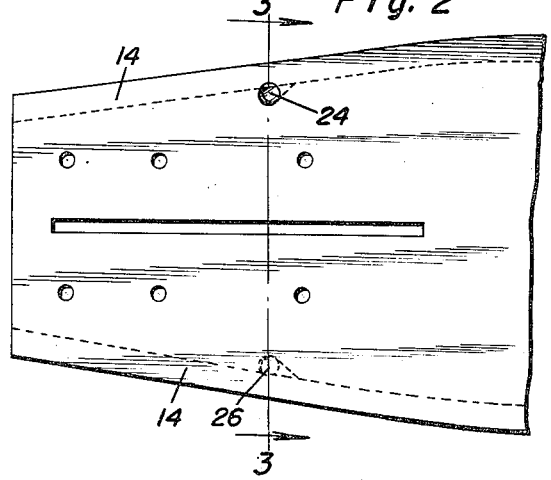
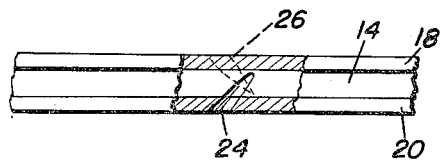
George M. Kneifl
INVENTOR.

2,765,823

CHAIN SAW BLADE WITH OILING MEANS

George M. Kneifl, Bloomer, Wis.

Application February 12, 1953, Serial No. 336,526

1 Claim. (Cl. 143—32)

This invention relates to power tools, and more particularly to an improved lubrication system for chain saws.

The primary object of this invention is to provide means for the lubrication of the chain cutter while eliminating the possibility of the lubricating passageways becoming clogged with sawdust and shavings.

The construction of this invention features angularly forwardly and upwardly extending lubricating passages which are adapted to provide oil to the chain cutter while permitting the chain cutter to carry away any sawdust, shavings or the like which would otherwise tend to clog the oil passageways.

Still further objects of the invention reside in the provision of a chain saw blade that includes means for greatly extending the life of chain cutters by providing means for adequate lubrication thereof, which may be easily incorporated into existing guide rails of chain saws at a minimum expenditure, and which will not otherwise affect the chain saw as to its fundamental operation or as to strength and durability.

These, together with the various ancillary objects and features of the invention, which will become apparent as the following description proceeds, are attained by this chain saw blade, a preferred embodiment of which has been illustrated in the accompanying drawings, by way of example only, wherein:

Figure 1 is a side elevational view showing the manner in which the chain saw blade having the novel lubricating passages therein is installed;

Figure 2 is an elevational detail of a guide rail incorporating the present invention;

Figure 3 is a vertical sectional view as taken along the plane of line 3—3 in Figure 2; and Figure 4 is a top plan view of the guide rail with parts thereof being shown in section for greatest detail.

With continuing reference to the accompanying drawings, wherein like reference numerals designate similar parts throughout the various views, reference numeral 10 generally indicates a chain saw which is provided with a guide rail 12 having a peripheral groove 14 centrally located in the upper and lower peripheral edges of the guide rail 12. The groove 14 forms a recess 16 between a pair of flanges 18 and 20 in both the upper and lower edges of the guide rail 12. In order to provide lubrication for the chain cutter 22 entrained about the guide rail 12, there are provided a pair of lubricating bores 24 and 26. The lubricating bore 24 opens into the side of the guide rail 12 and extends upwardly and forwardly to open into the recess 16. The bore 26 is identical to the bore 24, but extends in an opposed relationship so that when the guide rail 12 is reversed, after a considerable period of use, the lubricating conduit 30 connected to either of the bores 24 and 26 may be readily and easily installed. A pump 32 is provided for forcing lubricating oils through the lubricating conduit under pressure and into either of the bores 24 or 26 depending on the position of the guide rail 12. This oil under pressure will be directed into the recess 16.

During use, shavings, sawdust, chips and the like are liable to become lodged within the perpendicularly extending lubricating bores of conventional chain saws. This will stop the flow of oil and prevent adequate lubrication of the chain cutter which will cause excessive wear. However, any foreign matter that does become engaged within the angularly extending bores 24 or 26 of the present invention will be carried by the chain cutter 22 as it moves about the periphery of the guide rail 12, thus enabling the chain cutter to be properly lubricated.

Since from the foregoing, the construction and advantages of this chain saw blade are readily apparent, further description is believed to be unnecessary.

However, since numerous modifications will readily occur to those skilled in the art after a consideraion of the foregoing specification and accompanying drawings, it is not intended to limit the invention to the precise embodiment shown and described, but all suitable modifications and equivalents may be readily resorted to as desired.

What is claimed as new is as follows:

A chain saw blade comprising a reversible guide rail having a peripheral chain receiving groove between a pair of peripheral flanges, a chain cutter about said guide rail in said groove, said guide rail having a pair of bores therein spaced from said flanges so as not to extend through said flanges, said guide rail having length, breadth, and thickness and having forward and rearward ends, said bores extending angularly inwardly toward the middle of the thickness of said guide rail, said bores extending angularly outwardly toward the outer parts of the breadth of said guide rail and extending angularly forwardly along the length of said guide rail toward said forward end thereof, said bores forming openings in opposite sides of said guide rail with each of said bores forming openings in only one side of said guide rail, and a pressure lubrication pump secured to said guide rail at only one of said bores for pumping lubricating fluid in through said one of said bores so that all of said lubricating fluid will pass only into said groove.

References Cited in the file of this patent

UNITED STATES PATENTS

| 2,184,461 | Mall | Dec. 26, 1939 |
| 2,391,730 | Melvin et al. | Dec. 25, 1945 |

FOREIGN PATENTS

| 272,341 | Switzerland | Mar. 16, 1951 |
| 328,527 | Great Britain | May 1, 1930 |